United States Patent

Olson

Patent Number: 5,142,710
Date of Patent: Sep. 1, 1992

[54] CONTROLLED TOILET FLUSHING SYSTEM

[76] Inventor: Olof Olson, 729 - 12th Avenue P.O. Box 553, North Branch, Minn. 55056

[21] Appl. No.: 724,589

[22] Filed: Jul. 1, 1991

[51] Int. Cl.⁵ .......................... E03D 1/14; E03D 1/35
[52] U.S. Cl. .......................................... 4/325; 4/402
[58] Field of Search ................... 4/324, 325, 415, 393, 4/402

[56] References Cited

U.S. PATENT DOCUMENTS

| | | | |
|---|---|---|---|
| 3,345,648 | 10/1967 | Rafferty | 4/324 |
| 3,744,064 | 7/1973 | Preston | 4/325 |
| 3,921,226 | 11/1975 | Macdonald | 4/324 |
| 4,120,056 | 10/1978 | Phripp et al. | 4/324 |
| 4,145,775 | 3/1979 | Butler | 4/415 |
| 4,184,215 | 1/1980 | Birdsall | 4/324 X |
| 4,365,364 | 12/1982 | Riedel | 4/324 X |
| 4,764,996 | 8/1988 | Pino | 4/415 |
| 4,782,537 | 11/1988 | Kinslow | 4/415 |
| 4,841,580 | 6/1989 | Agostino | 4/402 X |
| 4,928,327 | 5/1990 | Kuhn | 4/415 X |

Primary Examiner—Henry J. Recla
Assistant Examiner—Robert M. Fetsuga

[57] ABSTRACT

A water saver being used in the toilet tank and which includes a discharge control and flapper tank ball for controlling the flow of water from the tank or reservoir to the bowl and with the water saver further having a generally cylindrical configuration with an open top and a closed bottom defining a water retaining chamber, with the chamber extending upwardly above the flapper tank ball and being designed to retain a fill of a certain first quantity of water. Pivotal opening of the water saver while tipping a portion of the water outwardly of the enclosure, will not dischasrge any appreciable amount of water so as to permit a more positive seal of the water saver resting on the top of the flapper tank ball which is upon the discharge drain opening.

1 Claim, 2 Drawing Sheets

CONTROLLED TOILET FLUSHING SYSTEM

CROSS REFERENCE TO RELATED APPLICATION

This application constitutes a full written description of that invention set forth in my Invention Disclosure Document No. 282894 filed with the United States Patent and Trademark Office on May 28, 1991.

BACKGROUND OF THE INVENTION

The present invention relates generally to a toilet tank flushing system, and more particularity to a device used to conserve the water utilized by such a tank during each flushing operation. The device embodied in the present invention allows the user to choose and select the quantity of water which will flow from the tank to the bowl by holding and actively maintaining the flush valve in open disposition. Additionally, the device embodied in this invention further aids in the conservation of water through the employment of mechanism which prevents water from flowing through the toilet bowl filler tube.

Water, perhaps nature's most precious resource, is becoming less and less available through increased demand and consumption. This problem may be further complicated by the existence of drought conditions such as those experienced in the western and mid-western portions of the United States during the 1980's into and continuing during the early 1990's. Fresh water is an indispensable resource, and it is finally being recognized that techniques for limiting quantities of its use provides significant benefits to nature and society through improved standards of living. For example, it has been recognized that the population growth in certain areas of this country and indeed the world is limited by virtue of the availability of a ready supply of fresh water.

Toilet bowls and tanks, in their usual and normal operation, utilize substantial and often unnecessarily large quantities of water. In order for a toilet to properly operate and flush, water is, of course, necessary. However, the quantity of water utilized during the flushing operation frequently, if not normally, exceeds the quantity reasonably required to achieve the desired result. Utilization of a device which would convert the standard toilet flush valve into a demand valve, where the user can control the quantity of water which is transferred and utilized, rather than simply providing a substantial excess, in combination with a device which would limit the amount of water flowing from the freshwater supply line to the bowl portion of the toilet would constitute one effective technique for appropriately limiting the often wasteful quantities of water now being used in connection with each flush of a toilet.

Toilet tanks must receive a charge of water at a relatively rapid rate in order to provide an appropriate flushing action. Only a modest quantity of water is initially required, to commence such action. The normal siphon action of the bowl will remove an adequate quantity of waste water from the bowl. Converting the passive flush valve into a demand valve would allow such siphoning action to occur in a normal sense, while saving significant quantities of water.

Toilet bowls traditionally have utilized a quantity of water far in excess of what is needed to sanitarily and efficiently dispose of solid and liquid human waste. In order to achieve the desired result, in accordance with the present invention, just several pints rather than several gallons of fresh water are required in connection with each flush. In accordance with the present invention, a controlled toilet flushing system is provided which is designed to both limit the quantity of water processed into the toilet bowl, while allowing the operator of the toilet to determine or tailor the quantity of water which will be used per flush. The controlled toilet flushing system embodied in the present invention is designed to function with conventionally designed toilet tanks, allowing normal application and retrofitting to occur. The system is designed to provide for immediate and positive closure of the flush valve, and thus reduces or substantially eliminates wasteful consumption of water in connection with the flushing of a toilet.

In accordance with the present invention, a water saver system is provided, said water saver system being attachable to the lift chain portion of a standard toilet tank valve system, said water saver system acting in such a way as to conserve significant amount of water during the flushing mode. Further provided is a stop mechanism which is inserted into the source valve of a toilet bowl filler tube, this stop mechanism acting to prevent water from flowing to the bowl portion of the toilet via the standard filler tube, thereby conserving additional amounts of water. The water saver system, along with the stop mechanism, are designed so as to function with conventionally designed toilet tanks, and thus normal application and retrofitting may easily occur.

The water saver portion of the system of the present invention consists of a water saver that holds water resting on the top of the floating flapper tank ball to hold it down on the drain. The flapper tank ball is attached to the left chain to lift it up when the operator of the toilet operates the trip lever which operates the arm that the chain is attached to.

Further objects of the present invention will become apparent from a study of the following specification, appended claims and accompanying drawing.

DESCRIPTION OF THE PREFERRED EMBODIMENT

Figure 1:
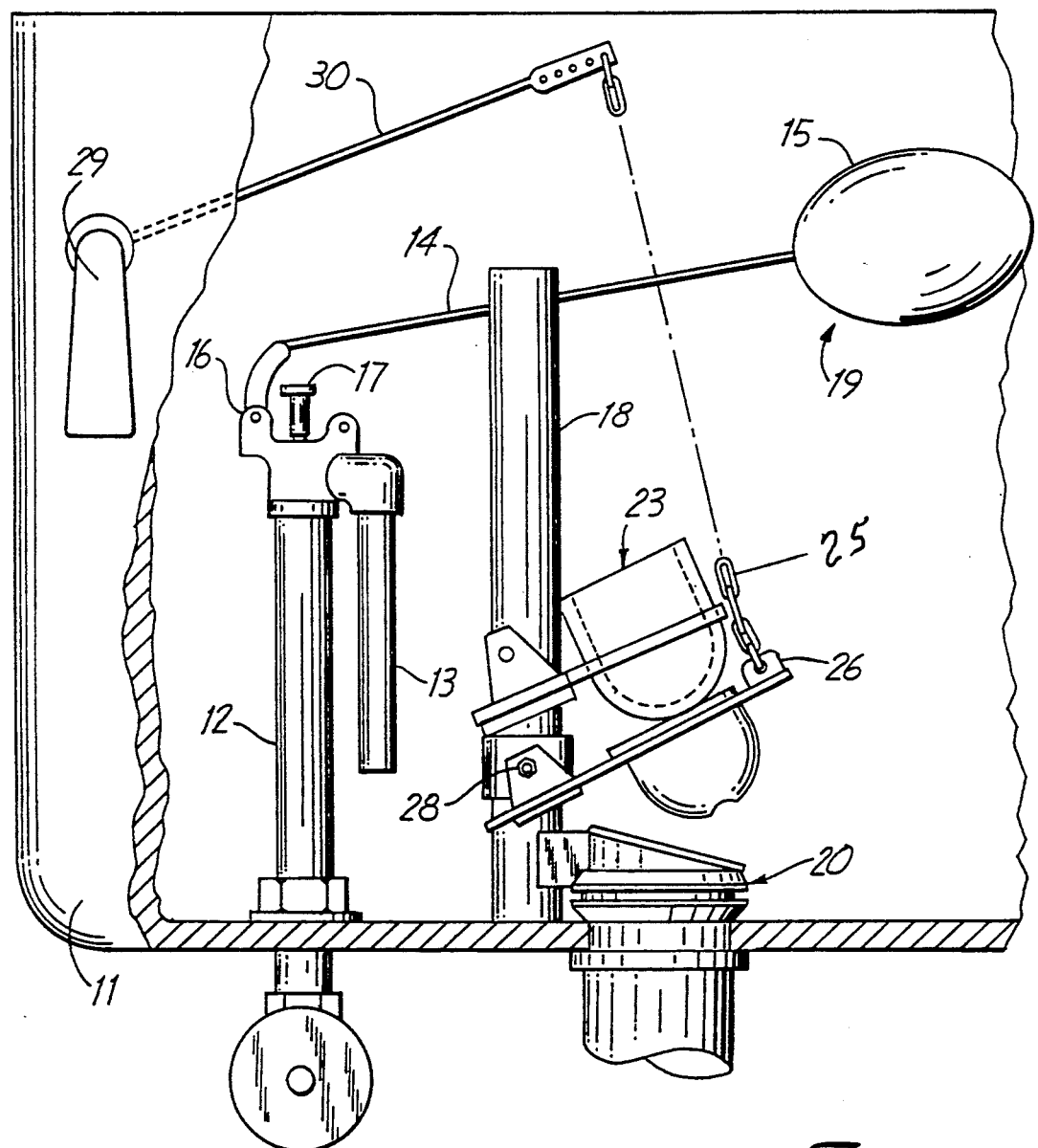
FIG. 1 is a front elevational view, partially broken away, illustrating the interior of a conventional toilet tank reservoir, and illustrating the controlled toilet flushing system of the present invention.
Figure 2:
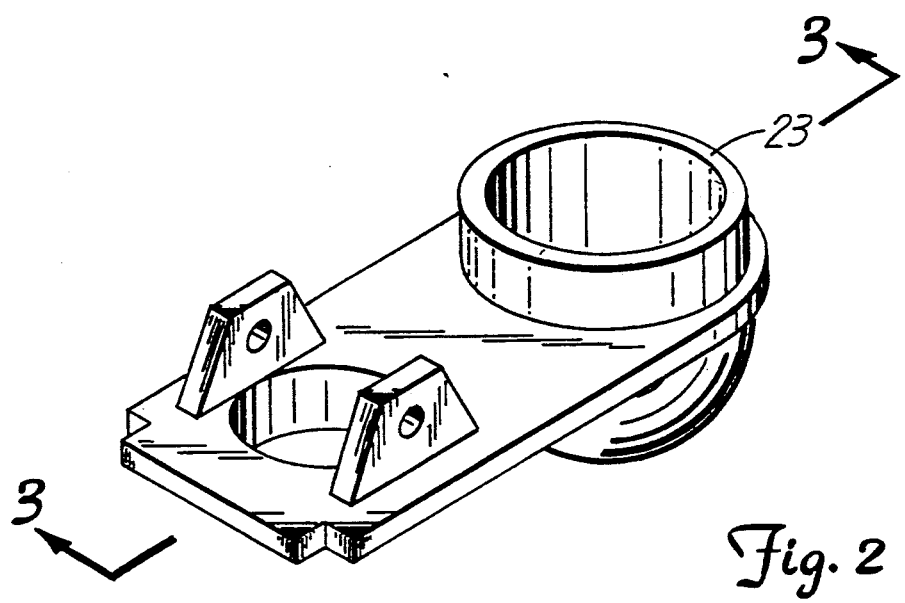
FIG. 2 is a detail view of the water saver portions of the instant invention.

In accordance with the preferred embodiment of the present invention, and with particular attention being directed to the drawing, the toilet tank and operative assembly generally designated 10 includes a tank or reservoir member 11 (normally fabricated of glazed porcelain) and defining a water reservoir therewithin, and with a water supply line being coupled thereto as at 12. The water supply line further includes a fill line 13, which operates off of a conventional ball-cock assembly, controlled by a float-arm 14 and a float 15 secured thereto at its distal or free end. Pivot means are provided at 16 in order to appropriately actuate the ballcock valve means, as is conventional in most of the commercially available devices of this type.

In most conventional tanks, a fill line is directed from a ball-cock to an overflow stand-pipe 18, which receives a flow of fresh water from fill line 12 whenever the ball-cock is open, with the water being directed to a point in the discharge drain 20. Under the present invention, however, a plug or stopper 17 is provided which prevents the flow of water from the ball-cock to the standpipe, effectively saving over 1 gallon of water per normal flush, which otherwise would have flowed down the standpipe 18 through the discharge drain, and into the bowl. In the preferred embodiment, the plug or stopper 17 is comprised of a generally soft plastic or synthetic material which will fit snugly into that portion of the ball-cock wherefrom the filler tube portion of a conventional toilet tank system usually originates.

The water supply system may be defined by the system generally designated 19, which includes the water supply line 12, fill line 13, and a ball-cock means controlled at pivot point 16 for float 15 and float arm 14.

In order to appropriately control the discharge of water from reservoir 11 into the bowl, discharge drain 20 is provided with an upper closure surface controlled by discharge control and closure valve assembly 26. This assembly includes a discharge control and closure valve 26 in the form of a buoyant flapper valve being actuated upon demand by a flexible link chain 25, which is coupled between control and closure valve 26 at point 24 and actuating arm 30. The closure valve 26 is pivoted to the standpipe 18 via a laterally extending mounting portion and projections 28 as is common in the art. In accordance with the present invention, a water saver is provided, said water saver acting to allow the user of the toilet to hold handle 29 in actuated position for only as long as is required to effectively flush the bowl. In other words, the user is allowed to control or tailor the quantity of water used during each flush. The water saver 23 is shaped similarly to a flapper valve and is located at a point immediately above the closure valve assembly 26, and said water saver pushes said closure valve assembly down to its closed position immediately upon the release of handle 29 by user. The water saver 23 is also pivoted to the standpipe 18 in a similar manner to closure valve 26. This system is to be contrasted with a conventional flushing system in which said closure valve assembly 26 gradually returns to its closed position, and remains open until the entire tank of water is emptied and passed down the discharge drain.

Once the closure valve assembly is completely closed and sealed, the water level in the tank will rise to its normal level, however because only a small portion of said water has left the tank, a lesser amount will be required to replenish the supply.

Figure 3:
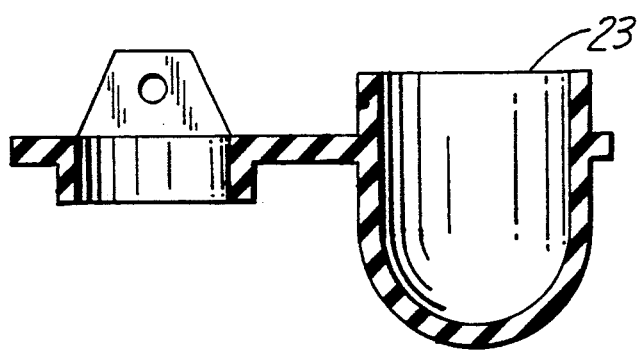
FIG. 3 is a perspective view of a flow-stopping device with an internal bore being formed therein to accommodate or accomplish an interruption of flow of water from a conventional supply in to the toilet bowl.
Figure 3:
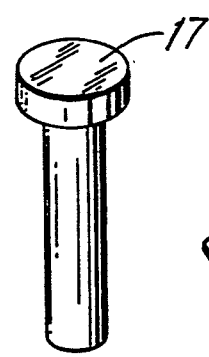

Further depicted in FIG. 3 is said stopping plug, 17. Said plug is ideally composed of a flexible plastic or rubber to enable said plug to securely fit into the bowl fill line valve of a conventional water supply line, located in said tank 11.

This arrangement has been found to conserve substantial quantities of fresh water without detracting from the normal and effective removal of waste from toilet bowls. Other embodiments may be fabricated without departing from the spirit and scope of the present invention.

I claim:

1. In combination with a toilet tank having a water reservoir, a water supply line coupled thereto, a discharge drain for delivering water from said reservoir to a toilet bowl disposed therebeneath, a ball cock valve means controlling the flow of water from such supply to said reservoir, an overflow standpipe mounted in said reservoir in communication with said discharge drain, a buoyant flapper valve closing an opening to said discharge drain and being pivotally mounted on said standpipe, and a water impervious discharge control and water saver for controlling the flow of water from said reservoir to said discharge drain, the improvement comprising:

(a) said discharge control and water saver having a generally cylindrical configuration with an open top and a closed bottom defining an upwardly open chamber;
   (b) said discharge control and water saver further having a mounting portion formed therewith and extending substantially laterally from said chamber, said mounting portion being pivotally mounted on said standpipe at a position above said flapper valve such that water contained in said reservoir can enter said chamber when such water is at a full level as controlled by said ball cock valve means, said mounting portion further being positioned on said standpipe such that at least a portion of said chamber bottom is continuously in contact with an upper surface of said flapper valve when said flapper valve is pivoted upwardly;
   whereby, said discharge control and water saver reduces the buoyancy of said flapper valve thereby allowing premature closing thereof.

* * * * *